(12) United States Patent
Leahy et al.

(10) Patent No.: US 8,260,677 B1
(45) Date of Patent: Sep. 4, 2012

(54) SYSTEM AND METHOD FOR PRE-APPROVING, REGULATING, AND EXECUTING SECURE TRANSACTIONS

(75) Inventors: Emer Leahy, Pound Ridge, NY (US); Donald Perun, Pound Ridge, NY (US)

(73) Assignee: Totalekidz LLC, Pound Ridge, NY (US)

( * ) Notice: Subject to any disclaimer, the term of this patent is extended or adjusted under 35 U.S.C. 154(b) by 0 days.

(21) Appl. No.: 13/244,996

(22) Filed: Sep. 26, 2011

Related U.S. Application Data (63) Continuation of application No. 13/209,320, filed on Aug. 12, 2011.

(51) Int. Cl.
*G06E 1/00* (2006.01)
*G06Q 7/00* (2006.01)

(52) U.S. Cl. .................. 705/26.1; 705/27.1; 705/39

(58) Field of Classification Search .............. 705/39
See application file for complete search history.

(56) References Cited

U.S. PATENT DOCUMENTS

| | | | | |
|---|---|---|---|---|
| 6,327,354 B1 * | 12/2001 | Pelletier et al. | .......... | 379/201.01 |
| 7,006,993 B1 * | 2/2006 | Cheong et al. | .......... | 705/38 |
| 2002/0049806 A1 * | 4/2002 | Gatz et al. | .......... | 709/203 |
| 2002/0120563 A1 * | 8/2002 | McWilliam et al. | .......... | 705/39 |
| 2003/0004897 A1 * | 1/2003 | Smith, IV | .......... | 705/76 |
| 2004/0230536 A1 * | 11/2004 | Fung et al. | .......... | 705/64 |
| 2004/0254893 A1 * | 12/2004 | Tsuei et al. | .......... | 705/74 |
| 2008/0004984 A1 * | 1/2008 | Sendo et al. | .......... | 705/26 |
| 2008/0009268 A1 * | 1/2008 | Ramer et al. | .......... | 455/412.1 |
| 2009/0254568 A1 * | 10/2009 | Vignisson et al. | .......... | 707/10 |

FOREIGN PATENT DOCUMENTS

| WO | WO 99/66428 | * | 12/1999 |
|---|---|---|---|
| WO | WO 01/50305 | * | 7/2001 |
| WO | WO 2009/111313 | * | 9/2009 |

* cited by examiner

*Primary Examiner* — Sarah Monfeldt
(74) *Attorney, Agent, or Firm* — Leason Ellis LLP (57) ABSTRACT

A system and method for regulating a proposed transaction between a first party and a seller is provided. The method includes providing a transaction intermediary machine (TIM) on a network that is associated with a transactional limitations database storing in relation to each of a plurality of unique identifiers at least one criterion that has been established by a second party, and concerning one or more transactional limitations imposed by the second party on the first party. A request for approval (RFA) is received from the seller at the TIM having a unique identifier provided by the first party and details concerning the proposed transaction between the first party and the seller. Then, the RFA is compared with the criteria, completion of the proposed transaction is approved and a payment to the seller is also approved, and personal identification information is provided from the TIM to the seller.

17 Claims, 2 Drawing Sheets

SYSTEM AND METHOD FOR PRE-APPROVING, REGULATING, AND EXECUTING SECURE TRANSACTIONS

CROSS-REFERENCE TO RELATED APPLICATIONS

The present application is a continuation application of U.S. patent application Ser. No. 13/209,320, filed Aug. 12, 2011, which is hereby incorporated by reference in its entirety.

TECHNICAL FIELD OF THE INVENTION

This disclosure relates generally to the field of regulating purchase transactions, and, in particular, to systems and methods for pre-approving one or more transactions between a first party and a seller over a distributed computer network.

BACKGROUND OF THE INVENTION

With the advent of the Internet, and, more recently, the proliferation of smartphones, e-commerce has become a preferred method of shopping for many individuals. In addition to the inherent convenience of being able to view and purchase items without having to travel to a physical store, there are many items (digital music and video downloads, for example) that are only available for purchase within an e-commerce framework.

Traditionally, credit cards have been the preferred payment method for e-commerce transactions. In most transactions, the user selects an item to purchase (placing it, figuratively, into a virtual 'shopping cart'), and then the user finalizes the transaction by providing his/her credit card number/information, billing information (generally a mailing address) and shipping information (also generally a mailing address), based upon which the seller can process the payment and ship/deliver the item.

Despite the convenience provided by standard e-commerce systems, several critical shortcomings remain. Firstly, presently available e-commerce systems are not conducive to enabling children to initiate and perform e-commerce transactions. This is due in part to the Children's Online Privacy Protection Act of 1998 (COPPA) (15 U.S.C. §§6501-6506), which imposes strict limitations upon the ability of a website to solicit personal information from individuals under the age of 13. In light of COPPA, children under 13 must obtain the permission of a parent/guardian (and such permission must be documented) in order to engage in e-commerce transactions. Due to the burdensome requirements that COPPA entails, many, if not most, e-commerce retailers (in addition to many parents/guardians) simply choose to avoid transactions with users under 13 entirely, and instead suggest that the parent/guardian themselves perform the purchase on behalf of the child. In addition, many children over the age of 13 are still precluded from engaging in e-commerce because a) they generally do not have their own credit cards, and b) because many sites and sellers will not do business with a child younger than 18.

A related problem exists within the realm of content/items that are available for purchase from a given e-commerce retailer. It can be readily appreciated that there are many items that are available for purchase on the Internet (for example, movies and video games) which a parent/guardian would not want his/her child to purchase. Presently, such a parent/guardian must personally review any e-commerce activity of the child in order to ensure that the child is not attempting to purchase an item that is not age appropriate or that the parent does not want the child to purchase. In addition, given the rapid changes in popularity trends, especially in items that appeal to children, parents/guardians may not be familiar with the item that the child wishes to purchase, and the parent/guardian may have no choice but to perform additional research on the product in order to determine whether it is age appropriate for the child or not.

In a similar vein, various frameworks exist wherein one entity (such as an administrative office of a government) provides certain financial benefits to one or more individuals. These benefits (such as food stamps) are generally accompanied by significant usage restrictions, dictating that the receiving individuals can only use the provided benefits at certain stores and, more importantly, only on certain products and/or classes of products. In light of these restrictions, such benefits are generally not accepted by e-commerce vendors, thus requiring those individuals receiving the benefits to visit physical retail establishments in order to use the benefits.

Moreover, it is well known that many individuals who attempt to comply with dieting regimens are unsuccessful. This lack of success can be attributed in part to a lack of self-control when purchasing food. Because existing payment methods such as credit cards do not restrict the ability of a user to purchase certain items, many individuals who attempt to diet ultimately fail because they are permitted to purchase foods that do not comply with their dieting requirements. The same holds true for various other addictions and/or vices such as smoking.

Finally, with respect to practically all current e-commerce transactions, potential buyers are generally required to manually input a complete set of purchasing information (generally including at least the buyer's credit card information, billing address, and shipping address) to each e-commerce retailer that the buyer wishes to purchase from, at least at the first point of contact with the retailer. The result of the present arrangement is that the buyer must manually enter substantially the same information each time he/she visits a new e-commerce retail site, resulting in a signification duplication of effort.

It is with respect to these and other considerations that the disclosure made herein is presented.

SUMMARY OF THE INVENTION

Technologies are presented herein for a system and method for regulating a proposed transaction. According to one aspect, a computer-implemented method for regulating a proposed transaction over a distributed computer network between a first party and a seller that has a commerce site accessible to the first party of the network is provided. The method begins by providing a transaction intermediary machine (TIM) on the network, the TIM including a processor, a control circuit, a memory accessible to the processor, and a regulation application comprising one or more software modules encoded in the memory and executed in the processor. A transactional limitations database is associated in secure communication with the TIM, the transactional limitations database storing in relation to each of a plurality of unique identifiers at least one criterion that has been established by a second party, where the at least one criterion concerns one or more transactional limitations imposed by the second party on the first party. A request for approval (RFA) of the proposed transaction is received from the seller at the TIM, the RFA comprising information communicated over the network and including (a) a unique identifier provided by the first party to the commerce site of the seller, and (b) a set of details concerning the proposed transaction between the first party and the seller which includes an amount for the proposed transaction yet which is free of personal identification information of the first party. Then, it is confirmed that the unique identifier is among the plurality of unique identifiers within the transactional limitations database associated with the TIM, and thereafter: the set of details in the RFA is compared by the TIM with at least one criterion stored in the transactional limitations database in relation to the unique identifier, completion of the proposed transaction is approved and a payment to the seller from an account of the second party for the amount of the proposed transaction if the RFA meets the criteria is also approved, and personal identification information is provided from the TIM to the seller that is sufficient to permit physical or electronic delivery to the first party in fulfillment of the proposed transaction. Execution of the transaction is denied if the unique identifier is unknown, or if the RFA does not meet the criteria in relation to the unique identifier.

According to another aspect, a transaction regulation system for regulating a proposed transaction between a first party and a seller over a network is provided. The system includes a processor, a control circuit operatively connected to the processor, a memory operatively connected to the control circuit and accessible by the processor, a regulation application stored in the memory and executable in the processor, and a transactional limitations database in communication with the control circuit, the transactional limitations database storing in relation to each of a plurality of unique identifiers at least one criterion that has been established by a second party, wherein the at least one criterion concerns one or more transactional limitations imposed by the second party on the first party. The regulation application, when executed by the processor, configures the control circuit to receive a request for approval (RFA) of the proposed transaction from the seller, the RFA comprising information communicated over the network and including (a) a unique identifier provided by the first party to the seller, and (b) a set of details concerning the proposed transaction between the first party and the seller which includes an amount for the proposed transaction yet which is free of personal identification information of the first party. The regulation application further configures the control circuit to confirm that the unique identifier is among the plurality of unique identifiers within the transactional limitations database, and thereafter: compare the set of details in the RFA with at least one criterion stored in the transactional limitations database in relation to the unique identifier, approve completion of the proposed transaction and a payment to the seller from an account of the second party for the amount of the proposed transaction if the RFA meets the criteria, and provide personal identification information to the seller that is sufficient to permit physical or electronic delivery to the first party in fulfillment of the proposed transaction. The regulation application also configures the control circuit to deny execution of the transaction if the unique identifier is unknown, or if the RFA does not meet the criteria in relation to the unique identifier.

These and other aspects, features, and advantages can be appreciated from the accompanying description of certain embodiments of the invention and the accompanying drawing figures.

DETAILED DESCRIPTION OF CERTAIN EMBODIMENTS OF THE INVENTION

By way of overview and introduction, the present disclosure details systems and methods for regulating a proposed purchase transaction such as an e-commerce purchase over the Internet. Traditionally, children who are old enough to browse the Internet and identify items they wish to purchase have been precluded from executing such purchases due to strict regulatory guidelines (such as COPPA) which restrict an Internet vendor's ability to solicit personal information from a child below a certain age. Parents/guardians of such children face similar frustrations in that they must personally and manually facilitate each and every transaction that their child wishes to execute. In addition, many parents/guardians maintain personal guidelines (which are different for each parent/guardian and child) which govern what items they will allow their children to purchase or otherwise obtain. In light of these and other shortcomings attendant with the current state of e-commerce (especially as pertains to children), the systems and methods disclosed herein provide both parents and children with the ability to initiate and execute purchase transactions in a way that is safe and efficient for both child and parent/guardian and which ensure that sellers are fully compliant with all applicable regulatory guidelines and laws.

As will be described in detail, the systems and methods disclosed herein enable the establishment of a unique identifier such as a user ID which can be provided by the child to the seller when making a purchase in lieu of personal information. Through the present systems and methods, the unique identifier provided by the child can be verified, and any necessary personal information (which has been previously provided by the parent/guardian and associated with the child's unique identifier) can be relayed to the seller, thereby complying with COPPA guidelines by avoiding solicitation of personal information from the child. In addition, the parent/guardian can define one or more criteria that a purchase initiated by the child must meet in order to be approved and executed. Such criteria can include product ratings, such as ratings for age appropriateness provided by third-party rating agencies such as the ESRB and MPAA. The present systems and methods further enable the querying of one or more external rating databases which maintain such independent/third-party ratings. By processing the proposed transaction between the child and the seller against the criteria established by the parent/guardian and independent/third-party ratings provided by an external rating database, the present systems and methods can ensure that transactions initiated by the child—even with sellers with whom the child and/or parent have no prior knowledge and/or experience—will be approved only if they meet the criteria established by the parent/guardian, such as guidelines for age appropriateness. Accordingly, implementation of the present systems and methods provides a much greater degree of integrity, efficiency, and safety across all child-initiated transactions, even those occurring with unknown or unverified sellers.

The following detailed description is directed to systems and methods for regulating a proposed purchase transaction. The referenced systems and methods are now described more fully with reference to the accompanying drawings, in which one or more illustrated embodiments and/or arrangements of the systems and methods are shown. The systems and methods are not limited in any way to the illustrated embodiments and/or arrangements as the illustrated embodiments and/or arrangements described below are merely exemplary of the systems and methods, which can be embodied in various forms, as appreciated by one skilled in the art. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods. Furthermore, the terms and phrases used herein are not intended to be limiting, but rather are to provide an understandable description of the systems and methods.

Referring now to the drawings, it is to be understood that like numerals represent like elements through the several figures, and that not all components and/or steps described and illustrated with reference to the figures are required for all embodiments or arrangements. It should also be understood that the embodiments and/or arrangements of the systems and methods disclosed herein can be incorporated as a software algorithm, application, program, module, or code residing in hardware, firmware and/or on a computer useable medium (including software modules and browser plug-ins) that can be executed in a processor of a computer system to configure the processor and/or other elements to perform the functions described below. Such a computer system typically includes memory storage configured to provide output from execution of the computer code, module or program. An exemplary computer system is shown as a block diagram in FIG. 1 which is a high-level diagram illustrating an exemplary configuration of a transaction regulation system 100. In one arrangement, transaction regulation system 100 can be a computer such as a personal computer or a server. In another arrangement, transaction regulation system 100 can be a plurality of computers and/or other electronic devices in communication with one another, though it should be understood that transaction regulation system 100 can be practically any computing device capable of embodying the systems and/or methods described herein.

Figure 1:
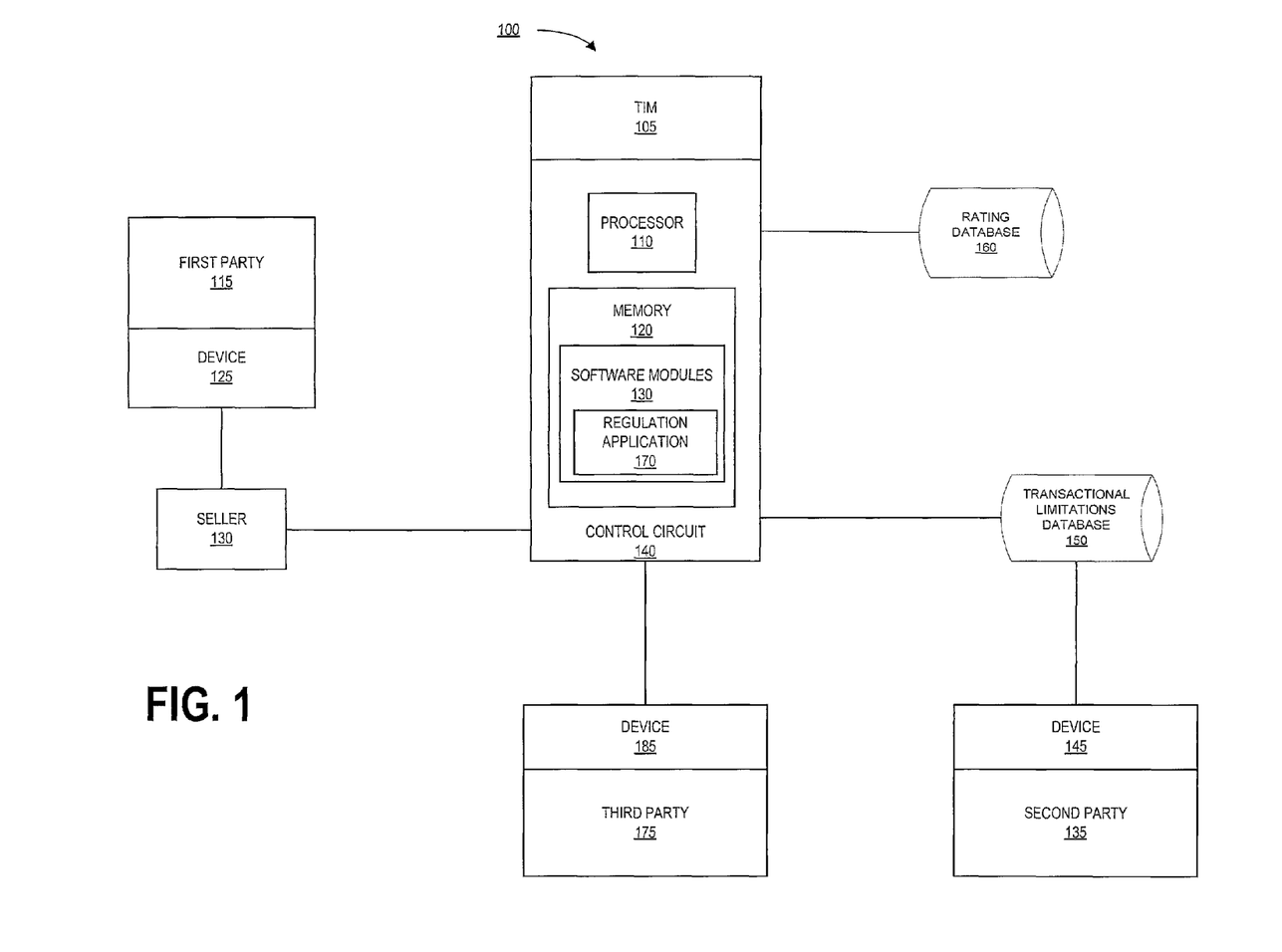
FIG. 1 is a high-level diagram illustrating an exemplary transaction regulation system.

Transaction regulation system 100 includes a transaction intermediary machine (TIM) 105. TIM 105 preferably includes a control circuit 140 which is operatively connected to various hardware and software components that serve to enable operation of the transaction regulation system 100. The control circuit 140 is operatively connected to a processor 110 and a memory 120. Memory 120 is accessible by processor 110, thereby enabling processor 110 to receive and execute instructions stored on memory 120.

One or more software modules 130 are encoded in memory 120. The software modules 130 can comprise a software program or set of instructions executed in processor 110. Preferably, included among the software modules 130 is a regulation application 170 that is executed by processor 110. During execution of the software modules 130, and specifically the regulation application 170, the processor 110 configures the control circuit 140 to regulate one or more proposed purchase transactions, as will be described in greater detail below. It should be noted that while FIG. 1 depicts memory 120 arranged on control circuit 140, in an alternate arrangement, memory 120 can be practically any storage medium (such as a hard disk drive, flash memory, etc.) that is operatively connected to the control circuit 140, even if not arranged on control circuit 140 as depicted in FIG. 1.

Also preferably connected to and/or otherwise in communication with control circuit 140 of TIM 105 are one or more databases, such as transactional limitations database 150 and rating database 160. The transactional limitations database 150 and the rating database 160 are each preferably a computing device (such as a personal computer or server) and/or several connected computing devices with a storage medium that is capable of maintaining the data/information that is described in greater detail below. In an alternative arrangement, each of the transactional limitations database 150 and rating database 160 can be a data storage device such as a hard disk, or an array of storage devices (e.g., RAID). It should be noted that while FIG. 1 depicts each of the transactional limitations database 150 and rating database 160 as a being a stand-alone element that is communicatively connected to control circuit 140, in other arrangements each of the transactional limitations database 150 and rating database 160 can be arranged on control circuit 140, such as being incorporated into memory 120.

Transactional limitations database 150 is preferably associated with and/or is otherwise in communication with TIM 105, and the transactional limitations database 150 preferably contains and/or stores one or more unique identifiers. The unique identifiers are preferably user identification names, numbers, codes, sequences, fingerprint identifiers, retina identifiers, or any other such scheme which can serve to identify a given individual. Preferably, in certain arrangements the unique identifiers are associated with a further identifier such as a password or passcode, and such further identifiers are also preferably contained by and/or stored in transactional limitations database 150. It should be understood that while in certain arrangements the unique identifiers and/or the further identifiers can be generated by the transactional limitations database or any other such computing device, in other arrangements the unique identifiers and/or the further identifiers can be provided in whole or in part by a user. It should also be noted that the unique identifiers preferably correspond to personal identification information that is also preferably contained by, stored at and/or accessible to transactional limitations database 150. The personal identification information preferably includes information such as an individual's name, address, contact information (e.g., email address, phone number, etc.), as well as payment information (for example, one or more credit cards and related information such as expiration dates, billing address(es), etc.), all of which is also preferably stored at transactional limitations database 150.

By having the unique identifiers correspond to a user's personal identification information, the TIM 105, in conjunction with the transactional limitations database 150, can ultimately provide the personal identification information on the basis of only an input of the unique identifier (preferably together with the further identifier).

In certain arrangements, the personal identification information contained by and/or stored at transactional limitations database 150 is preferably provided to transactional limitations database 150 by a second party 135 through device 145. In addition, in certain arrangements second party 135 through device 145 can establish and/or provide one or more criteria that govern transactions proposed by a first party 115. By way of illustration, second party 135 can be a parent/guardian who wishes to enable a child (first party 115) to purchase items (such as from seller 130) within certain guidelines/restrictions set by the parent/guardian (second party 135). In order to achieve such an outcome, second party 135 through device 145 provides the personal identification information (e.g., name, email address, phone number, etc.) and payment information (for example, one or more credit cards and related information such as expiration dates, billing address(es), etc.) for and/or on behalf of first party 115 (the child). This information is preferably associated with the unique identifier that corresponds to first party 115 such that upon approval of the transaction by the TIM 105, the TIM 105 can provide the seller 130 with the personal identification information and/or the payment information. In addition, second party 135, through device 145, can also preferably provide rating criteria for and/or on behalf of first party 115 (for example, that first party 115 cannot purchase anything that has not been rated as appropriate and/or safe for a 10 year old child), and this rating criteria can be associated with the unique identifier that corresponds to first party 115 such that TIM 105 can consider such criteria in evaluating a proposed transaction.

Rating database 160 is also preferably connected to and/or otherwise in communication with control circuit 140. In certain arrangements, rating database 160 is a database that contains ratings, such as third-party ratings and/or user ratings that correspond to one or more products, items, and/or services. In other arrangements, rating database 160 can be a computing device that can query and/or access other external rating repositories (for example, websites that provide product ratings such as metacritic.com, rottentomatos.com, and kids-in-mind.com). As will be described in greater detail below, the ratings stored by and/or accessible to ratings database 160 can provide TIM 105 with rating information that can be considered when evaluating whether a proposed transaction should be approved or denied. It should be noted that the ratings referenced herein can be ratings provided by established rating agencies (e.g., ESRB, MPAA, etc.), ratings provided by individuals, ratings provided by the product manufacturer themselves (e.g., an age appropriateness rating), and/or any combination thereof. Additionally, various sub-ratings are also possible, such as within movie ratings. For example, while the MPAA may rate a movie PG-13, the movie may have a high rating for violent content, a medium rating for cursing, and a low rating for adult/suggestive content.

At this juncture, it should be noted that although FIG. 1 depicts transactional limitations database 150 and rating database 160 as being connected to TIM 105, in certain arrangements this connection can be employed over a wide area network such as the Internet. In addition, although FIG. 1 depicts transactional limitations database 150 and rating database 160 as being connected to TIM 105, in certain other arrangements transactional limitations database 150 and/or rating database 160 can be incorporated within TIM 105, including, for instance, by storing transactional limitations database 150 and rating database 160 at memory 120.

It should be further noted that in certain arrangements various products and/or services can be registered with TIM 105 prior to a transaction being initiated. By way of example, seller 130 can provide an inventory listing of products (e.g., toys, movies, or video games) and/or services (e.g., subscriptions to various print or electronic media or portals) that are available for sale at the seller's website. Preferably, the inventory listing includes information relevant to the particular items, such as an item title, an item description, images of the item, and/or the cost of the item. Upon receiving the seller's 130 inventory listing, TIM 105 (using one or more software modules 130) can parse the information included in the inventory listing (thereby ensuring uniform listings across products registered by different vendors), and can further incorporate external information, such as item ratings from rating database 160 that correspond to various items in the inventory listing. In doing so, the seller can ensure that the products offered for sale on the seller's website will be evaluated accurately by TIM, specifically by ensuring that accurate rating information is ascribed to each of the respective items in the inventory listing.

In certain arrangements, a third party 175 can be connected to and/or otherwise be in communication with TIM 105 through device 185. For example, third party 175 can be a credit card company that receives information from TIM 105 relating to a proposed transaction and executes the transaction. It should be noted that, in other arrangements TIM 105 can be under the control of third party 175 (such as if TIM 105 is owned/operated by a credit card company in an integrated fashion), in which case the various features and functionalities of device 185 can be subsumed within TIM 105.

In the description that follows, certain embodiments and/or arrangements are described with reference to acts and symbolic representations of operations that are performed by one or more devices, such as the TIM 105 of transaction regulation system 100 of FIG. 1. As such, it will be understood that such acts and operations, which are at times referred to as being computer-executed, include the manipulation by the processor of the computer of electrical signals representing data in a structured form. This manipulation transforms the data and/or maintains them at locations in the memory system of the computer, which reconfigures and/or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments and/or arrangements may be described in a general context of computer-executable instructions, such as program modules, being executed by a computer. Generally, program modules include routines, programs, objects, components, data structures, etc., that perform particular tasks or implement particular abstract data types.

The operation of the transaction regulation system 100 and the various elements described above will be further appreciated with reference to the method for regulating a proposed purchase transaction as described below, in conjunction with FIG. 2.

Figure 2:
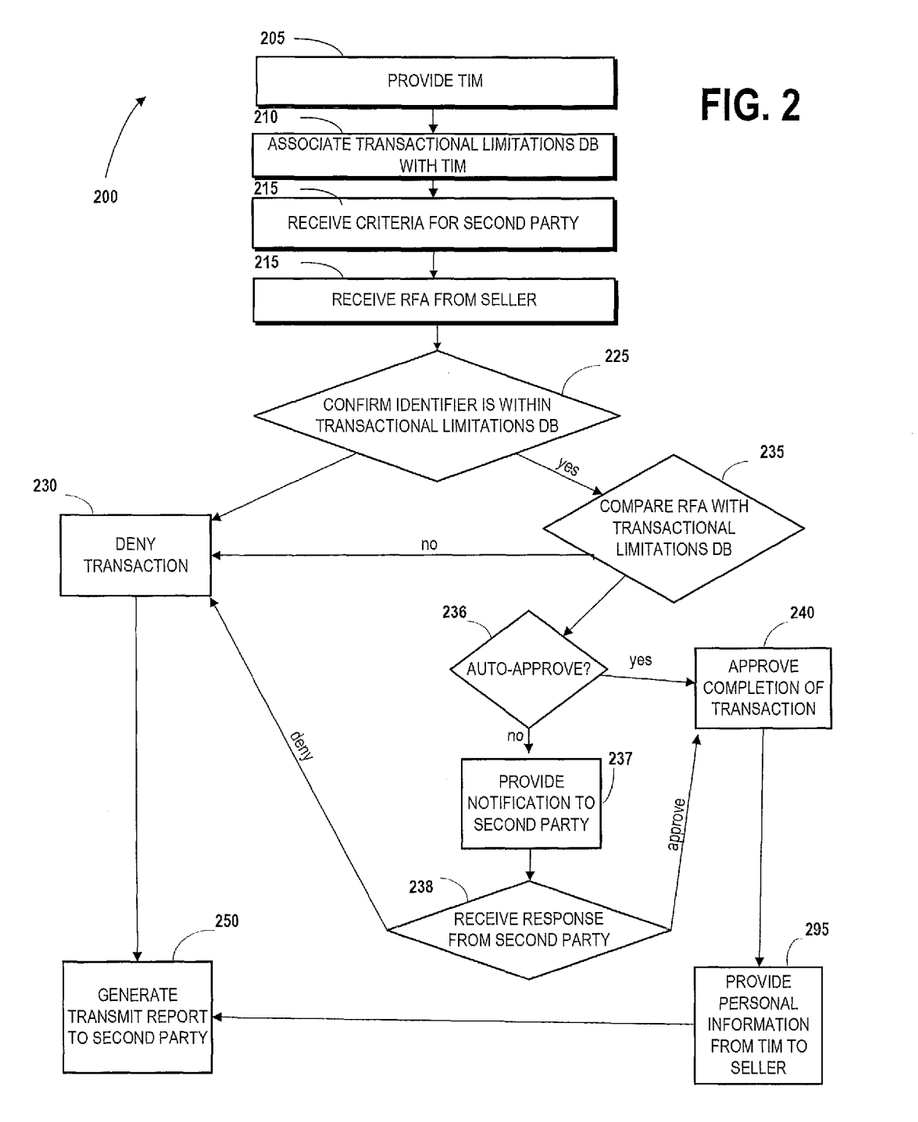
FIG. 2 a flow diagram is described showing a routine 200 that illustrates a broad aspect of a method for regulating a proposed transaction in accordance with one exemplary embodiment.

Turning now to FIG. 2, a flow diagram is described showing a routine 200 that illustrates a broad aspect of a method for regulating a proposed purchase transaction in accordance with at least one embodiment disclosed herein. It should be appreciated that several of the logical operations described herein are implemented (1) as a sequence of computer implemented acts or program modules running on TIM 105 of transaction regulation system 100 and/or (2) as interconnected machine logic circuits or circuit modules within the TIM 105 of transaction regulation system 100. The implementation is a matter of choice dependent on the requirements of the device (e.g., size, energy, consumption, performance, etc.). Accordingly, the logical operations described herein are referred to variously as operations, structural devices, acts, or modules. Various of these operations, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

The process 200 begins at step 205 where a TIM 105 is provided on a network, such as a distributed computer network. As discussed above, the TIM 105 preferably includes a processor 110, a control circuit 140, a memory accessible to the processor 120, and a regulation application 170 comprising one or more software modules encoded in the memory 120 and executed in the processor 110. At various points throughout process 200, TIM 105 can be connected to and/or be in communication with one or more of a first party 115, device 1 125, seller 130, rating database 160, transactional limitations database 150, second party 135, device 2 145, third party 175, device 3 185, and/or any other such system and/or device capable of communication and/or connection with TIM 105 in furtherance of the method for regulating a proposed transaction as disclosed herein. It should be noted that these communications and/or connections can be achieved and/or implemented in any number of ways, including but not limited to network communication (including Ethernet and wireless connections), serial and/or parallel circuits, near field communication (NFC), Bluetooth, and/or any other such communication and/or connection method.

At step 210, a transactional limitations database 150 is associated with TIM 105. Preferably, the transactional limitations database 150 is associated in secure communication with the TIM 150 in order to ensure the security of communications between the transactional limitations database 150 and the TIM 105. As noted above, the transactional limitations database 150 preferably stores a plurality of unique identifiers (for example, user identification names, numbers, etc.) that are associated with and/or that correspond to personal identification information (for example, name, address, etc.). The transactional limitations database 150 also preferably includes at least one criterion that has been established by a second party 135 in relation to each of a plurality of unique identifiers, in which at least one criterion preferably concerns one or more transactional limitations imposed by the second party on the first party. By way of example, first party 115 can be a child while second party 135 can be the parent/guardian of the child (first party 115). The transactional limitations database 150 thus stores a unique identifier that corresponds to the identity (that is, the personal identification information) of the first party 115 (that is, the child) (it should be noted that much, if not all, of the personal identification information is preferably provided by the second party 135—here, the parent/guardian—thereby complying with applicable regulatory guidelines such as COPPA). In addition, the transactional limitations database 150 also includes at least one criterion established by the parent/guardian (second party 135) that imposes limitations on the ability of the child (first party 115) to successfully execute purchases/transaction through TIM 105. For example, the parent/guardian can define a spending limit that the child cannot exceed in a given time period. By way of further example, the parent/guardian can establish additional criteria such as content restrictions (e.g., the child can only purchase items that have been rated as being age appropriate) and vendor restrictions (e.g., the child can only purchase items from specific sellers), as will be described in greater detail below.

It should be noted that any and all references provided herein that pertain to actions, events, and/or operations taken by and/or performed or executed with relation to various individuals/users, including but not limited to first party 115, second party 135, third party 175, and seller 130, are referred to as such for purposes of convention, convenience, and/or clarity. However, it should be understood that these various actions, events, and/or operations, are performed, executed, and/or enabled by one or more electronic and/or computing devices, including but not limited to device 125, device 145, and/or device 185.

At step 215, the second party 135 preferably transmits, and the transactional limitations database 150 preferably receives one or more criteria from the second party 135. As referenced above, the criteria can pertain to practically any aspect of a given transaction, including but not limited to cost, category of item, rating(s), and identity of seller. As illustrated above, a parent/guardian can establish any number of criteria which define various restrictions and/or limitations upon the transaction(s) that a child can successfully execute through TIM 105, whether the transactions are directly with seller 130 or through another network location. It should also be noted that the parent can edit, update, and add to the criteria at any time.

Then at step 220, the seller 130 transmits, and the TIM 105 receives one or more requests for approval (RFA). Preferably the RFA includes information communicated over the network, including a unique identifier (such as a user ID, preferably corresponding to the identity of the first party 115) and a further identifier (such as a corresponding password). These communications can include security layers to shield information from the sellers if desired. The RFA also preferably includes one or more details (or a set of details) concerning the proposed transaction between the first party and the seller. Among such details is preferably at least an amount (such as a price or charge) for the proposed transaction. Thus, by way of illustration, the first party 115 (such as a child) can interact with seller 130 through device 125, such as a smartphone and/or other such computing device accessing the e-commerce website of seller 130. It should be noted that in certain arrangements first party 115 interacts with seller 130 through an application ('app') executing on a smartphone, such as device 125, while in other arrangements first party 115 interacts with seller 130 through an webpage or interface viewable through an Internet browser executing on a personal computing device, such as device 125. Upon selecting an item from the website of seller 130 for purchase, the first party 115 can be prompted to input his/her unique identifier and further identifier (e.g., a user ID and password) that has previously been registered with and/or otherwise coordinated by TIM 105. Then, seller 130 generates the RFA which includes at least the unique identifier provided by the first party 115 and at least some additional transaction details such as information regarding item that the first party 115 is attempting to purchase. The RFA is then transmitted to, and received by TIM 105. Accordingly, it should be noted that in this way the first party 115 (such as a child) can initiate an online retail transaction without providing any personal information such as name, address, telephone number, etc.

At this juncture it should be noted that while in certain arrangements device 125 is a device that is generally under the control and/or ownership of first party 115, in other arrangements device 125 can be provided by seller 130. That is, while in certain scenarios, such as the example provided above, the first party 115 will engage with the seller's 130 website through device 125 that can belong to first party 115, in other arrangements the seller 130 can provide device 125, into which the first party 115 provides his/her unique identifier. For example, in a retail context, first party 115 can select an item to be purchased from seller's 130 retail establishment. When checking out, the first party 115 can provide his/her unique identifier (and accompanying further identifier) into an input device such as a keypad (device 125) that is provided by seller 130 at a payment station. In doing so, the first party 115 can utilize the payment features provided by TIM 105, and the second party 135 can similarly implement the desired limitations upon the purchases of first party 115, even in a real world retail context.

It should be further noted that in certain arrangements, a particular device, such as device 115 can be registered to a particular user, such as first party 115. Moreover, in certain arrangements such registration can be effected by another party, such as second party 135. By way of example, a parent/ guardian (second party 135) may wish that their child (first party 115) should only be able to initiate RFAs using a particular device, such as the child's smartphone (device 125). In such a scenario, the parent/guardian can establish such a registration in conjunction with TIM 105 (using one or more of software modules 130), wherein the particular device 125 is registered with the unique identifier of first party 115. In doing so, TIM 105 will only successfully process RFAs from first party 115 (that is, requested using the first party's 115 unique identifier) that originate at device 125, while other such RFAs that are provided from other devices will either be denied, or else require additional input from first party 115 and/or second party 135 prior to being approved by TIM 105. Additionally, in certain arrangements the parent/guardian can similarly register their child (that is, the unique identifier associated with the child) to only have the ability to successfully initiate RFAs from certain sellers 130, such as sellers that are known to and/or trusted by the parent/guardian.

Upon receiving the RFA, at step 225 the TIM 105 confirms that the unique identifier is among the plurality of unique identifiers within the transactional limitations database 150 associated with the TIM 105. In doing so, the TIM compares the unique identifier (in addition to the further identifier, such as a password) with the plurality of unique identifiers stored in and/or accessible by transactional limitations database 150, thereby ensuring the identity of first party 115 and further enhancing the integrity of the proposed transaction.

If, at step 225, the TIM 105 cannot confirm that the unique identifier provided in the RFA is included in the transactional limitations database 150, then the process 200 proceeds to step 230 where the proposed transaction is denied. Alternatively, the TIM 105 can return a message and/or prompt to seller 130 requesting that the first party 115 re-enter or otherwise provide a new unique identifier, and, upon receiving the new unique identifier the TIM 105 can return to step 225.

If, at step 225, the TIM 105 does confirm that the unique identifier provided in the RFA is included in the transactional limitations database 150, then the process 200 proceeds to step 235 where the TIM 105 compares the one or more details (such as a set of details) in the RFA with at least one criterion stored in the transactional limitations database 150 in relation to the unique identifier, as described in detail above. That is, based on the criteria established by the second party 135, such as cost-based limitations (e.g., a monthly spending limit), category of item-based limitations (e.g., only books can be purchased), rating(s)-based limitations (e.g., only movies rated G or PG), and identity of seller-based limitations (e.g., only purchases from Amazon.com), the TIM 105 can evaluate the RFA by comparing the set of details in the RFA with the previously established criteria which define the criteria that an RFA on behalf of first party 115 must meet in order to be approved by TIM 105. It should be noted that in certain arrangements, when performing the comparison of step 235, the transaction limitations database 150 and/or the TIM 105 can query rating database 160, as needed. For instance, if the second party 135 has established a criterion that first party 115 can only purchase video games that have been rated by the ESRB rating board as being appropriate for children ages 10 and younger, upon receiving the RFA from seller 130 containing the title of a video game which first party 115 wishes to purchase, transactional limitations database 150 and/or TIM 105 can query rating database 160 in order to determine the ESRB rating for the specific video game in the RFA. Based on the information provided by the rating database 160, the TIM 105 can then compare the criteria in the transactional limitations database 150 with the rating provided by the rating database 160 in order to determine if the transaction should be approved or not. It should also be noted that in certain transactions, such as those conforming to certain defined criteria, further review and/or approval by the second party 135 will be required prior to the execution of the proposed transaction, as will be described in greater detail below.

If, at step 235, the TIM 105 determines that the RFA does not meet the criteria established by the second party 135 as relates to the unique identifier (that is, the identity of first party 115), then the process 200 proceeds to step 230 where the transaction is denied. For example, if one of the criteria established by the second party 135 is that the first party 115 cannot purchase movies rated PG-13 or above, if the TIM 105 receives an RFA from a seller 130 that corresponds to a proposed purchase by the first party 115 of a movie that is rated PG-13, such a purchase will not meet the criteria established for approved purchases, and will thus be denied. As will be described in greater detail below, in certain arrangements the second party 135 can override the denial, and subsequently approve an RFA that does not meet the criteria stored in the transaction limitations database 150.

However, if, at step 235, the TIM 105 determines that the that the RFA does meet the criteria established by the second party 135 as relates to the unique identifier (that is, the identity of first party 115), then the process 200 proceeds to step 236 where the TIM 105 determines if the RFA should been automatically approved. That is, second party 135 can define criteria (such as at step 215) such that certain RFAs initiated by first party 115 will be approved automatically (that is, without requiring further input from second party 135), while other RFAs are to require further review and/or approval by second party 135 prior to approval. By way of example, a parent (second party 135) can define criteria such that certain RFAs from a child (first party 115), such as movies rated PG, are to be approved automatically by TIM 105 without requiring further input from the parent, while other criteria can be defined such that other RFAs, such as movies rated PG-13, will require further review and/or approval from the parent prior to completing the proposed transaction. In another arrangement, RFAs wherein it cannot be immediately determined whether the transaction fully conforms to the defined criteria can also proceed to step 236. For example, while second party 135 can establish that only movies rated PG or below are to be approved, certain RFAs may not contain a movie rating field (due to processing error or actual lack of a rating, such as a foreign film). In such a scenario, where the established criteria cannot be affirmatively determined to have been met (or not met) by the RFA, the TIM 105 can follow an approach similar to that of those RFAs that require further review/approval, as described below.

If, at step 236, the TIM 105 determines that the RFA is not automatically approved, then, at step 237, the TIM 105 (in conjunction with the transaction limitations database 150) provides, and the device 145 preferably receives, one or more notifications and/or messages (such as an email, text message, notification/alert within an application, or any other such electronic notification) directed to the second party 135. These notifications preferably include information that is likely to be pertinent to the second party 135 in evaluating whether to approve or deny the RFA. Examples of such pertinent information include: the name/identity of the vendor, the name/identity of the first party 115 (e.g., the child), content information regarding the item(s) selected for purchase (e.g., title, description, photo/video, etc.), third party/user ratings of the selected item (from rating database 160 and/or external rating sources), price/cost of the selected item, and/or price comparison information showing the cost of the same/comparable item at other retailers. In certain arrangements, the information or criteria the triggered the need for review (such as a missing rating, as referenced above) can also be provided and/or highlighted in the notification. Providing such information to the second party 135 enables the second party 135 to quickly review the RFA and the various factors to be considered in deciding whether to approve or deny the RFA, without having to consult outside resources prior to approval or denial.

Then, at step 238, the second party 135, through device 145, preferably transmits, and the TIM 105 preferably receives a response reflecting the second party's 135 decision regarding the RFA. If the second party 135 denies the transaction, the process 200 proceeds to step 230. If the second party 135 approves the transaction, the process 200 proceeds to step 240.

It should be noted that, given that the operation at step 238 is reliant upon an input provided by second party 135 (which, in turn, is in response to a notification provided by TIM 105), in certain scenarios and/or circumstances a response from second party 135 (approving or denying the proposed transaction) may not be received by TIM 105 in a timely fashion. In such cases, a default response can be defined by second party 135 (and provided to TIM 105 through device 145) which will be employed by TIM 105 in the event that no response is received from second party 135 within a defined time interval. By way of example, second party 135 can establish that if no approval or denial is received by TIM 105 within 24 hours, the RFA is to be automatically denied by default. In other arrangements a similar default setting can be established that approves all such transactions by default. Additionally, the TIM 105 can be configured to transmit periodic follow-up notifications to device 145 until a response is received.

Whether the proposed transaction has been automatically approved (such as at step 236), or manually approved (such as at step 238), at step 240 the TIM 105 approves completion of the proposed transaction. In doing so, the TIM 105 also preferably approves a payment to the seller from a payment account (such as an account of the second party 135) for the amount of the proposed transaction. In doing so, the TIM 105 also preferably returns a confirmation notice, message, and/or prompt to seller 130, first party 115, and/or second party 135, indicating at least that the transaction has been approved.

Then, at step 245, the TIM 105 provides personal identification information to the seller 130 in order to enable the seller 130 to complete the transaction. Preferably, the personal information provided by the TIM 105 is at least sufficient to permit physical or electronic delivery to the first party in fulfillment of the proposed transaction. By way of example, the TIM 105 can provide the seller with the email address and/or the mailing address of first party 115. Accordingly, it can be appreciated that by implementing transaction regulation system 100, including TIM 105, and/or the method for regulating a proposed transaction (as depicted in process 200) a transaction can be initiated and executed in full compliance with regulatory requirements such as COPPA, without requiring a child (e.g., first party 115) to provide any such personal identification information (e.g., name, address, etc.) to seller 130. Rather, as noted above, any/all personal identification information relating to first party 115 has preferably already been provided to transactional limitations database 150 and/or TIM 105, in advance of the particular purchase transaction by a person who is not a child, but rather, an adult, a guardian, and so on. Thus, upon meeting the criteria, the TIM can provide this information to the seller 130, in full compliance with regulatory guidelines precluding children from providing personal identification information without consent from a parent/guardian. In addition, by implementing transaction regulation system 100, including TIM 105, and/or the method for regulating a proposed transaction (as depicted in process 200), the second party 135 can empower the first party 115 to initiate and/or execute retail transactions without requiring frequent and/or constant input from the second party (such as the inputting of a credit card number, mailing address, etc.).

Irrespective of whether the RFA was ultimately approved (as in the sequence of steps 225-245) or denied (as in step 230), the TIM 105, at step 250 reports the RFA to the second party 135, as shown at block 250. That is, the TIM 105 generates and/or transmits a report (such as an email or any other such prompt, message, and/or notification) based on the RFA that informs the second party 135 of any/all transactions that the first party 115 has attempted to execute through TIM 105. In doing so, the second party 135 can easily monitor the activity of first party 115. It should be noted that in certain arrangements, such as scenarios where the RFA corresponds to the purchase of a subscription and/or an ongoing service (for example, a subscription to a music site allowing a certain number of music downloads per month), multiple reports can be generated and/or transmitted, each of which corresponds to a particular transaction and/or instance pertaining to the purchased subscription (e.g, a renewal or continuation of a subscription service for another month, or the download of a particular song, album, or movie within the context of a subscription service). In such a way, second party 135 can track and manage the activity of first party 115 within the context of a purchased subscription.

It should also be noted that in certain embodiments second party 135 can establish rules through TIM 105 such that the referenced reports are only generated and/or sent under certain circumstances. For instance, second party 135 can dictate that such reports should only be send on purchases above a certain price, or that such reports should only be sent for proposed transactions by first party 125 that have been denied by TIM 105.

As noted above, at step 250 the TIM 105 reports the RFA to the second party 135, even when the RFA is denied, as in step 230. However, it should be noted that in certain arrangements the second party 135 can override the denial, and subsequently approve the RFA. For example, while the second party 135 can establish rigid spending criteria for first party 115, the second party may occasionally agree to allow first party 115 to exceed the spending criteria, such as on a special occasion (e.g., a birthday). Thus, if the second party has not modified the criteria in transactional limitations database 150 accordingly, the TIM will still deny a proposed transaction that does not comply with the defined criteria. As such, the second party 150 can override the denial and subsequently approve the transaction. In such a case, the process continues on from step 240, substantially as described above.

It should be understood that various additional features and/or functionalities can be integrated within transaction regulation system 100, including TIM 105, and/or the method for regulating a proposed transaction (as depicted in process 200). By way of example, a customized search module, function, and/or portal can be employed which is preferably accessible by the first party 115 when providing his/her unique identifier (and further identifier), thereby enabling TIM 105 to determine criteria that have been established for the first party 115. Such a customized search module, function, and/or portal can preferably utilize the criteria established by second party 135 and stored in transactional limitations database 150 to restrict the searching ability of first party 115 to only those items/services which meet the criteria of transactional limitations database 150 for approval. In doing so, TIM 105 can provide search results to the first party 115 that meet the criteria established by second party 135. As such, the first party's 115 searches (at least within the realm of searches for products and/or services to purchase) are restricted to items which TIM 105 can dictate (based upon the information in transactional limitations database 150) will be approved for purchase. Doing so enables the first party 115 to efficiently evaluate items/services that can be purchased by him/her, while avoiding spending time considering items/services that will not be approved. In addition, in certain arrangements, TIM 105 can be configured such that the process of approving the proposed transaction can be expedited if initiated through a search feature which limits the first party to only being able to initiate a purchase of items that are known or that have been determined to be approved for the first party 115 based on the criteria established by the second party 135. Accordingly, the results returned by the search module to the first party 115 can be said to be pre-approved. In addition, all such criteria are codified as rules that are stored in memory 120 and used by the processor 110 to make automated determinations whether to approve a particular proposed transaction.

Additionally, based on the personal identification information associated with a given first party 115 (such as an age and/or a location), in addition to the criteria established for the first party 115 by the second party 135, and/or the purchasing tendencies and/or history of first party 115 (which can be tracked by TIM 105), a module, function, and/or portal can also be provided that generates coupons and/or promotions directed towards first party 115. That is, TIM 105 can generate promotions (preferably with the cooperation and/or input of one or more sellers 130) that provide promotional pricing offers and/or opportunities for first party 115 which are known to conform to the limitations imposed by second party 135 based on the criteria stored in transactional limitations database 150. Such coupons and/or promotions can be correlated with the personal identification information (such as an age and/or a location) of first party 115, increasing the likelihood that such coupons and/or promotions will appeal to first party 115. Furthermore, such coupons and/or promotions can be further correlated with information relating to previous purchases of first party 115, thereby further increasing their likelihood of appealing to the first party 115. In certain other arrangements the coupons and/or promotions can be correlated with transactions that are presently underway or in the process of formation (e.g., while the first party is searching for, reviewing, and/or selecting an item for proposed purchase). Thus, based upon the personal information, established purchasing criteria, and purchasing history of a given first party 115, TIM 105 can generate coupons and/or promotions that have a high likelihood of appealing to the first party 115 to which they are targeted.

As has been noted above, while the present systems and methods have been primarily described herein when applied to one or more scenarios and/or settings involving parents/guardians establishing transaction limitations for a child, the present systems and methods are also similarly applicable in a broad range of contexts. By way of example, the present systems and methods can be applied in context of governments benefits, wherein a governmental agency can establish certain criteria within which purchases of a recipient of such benefits must conform in order for a transaction to be approved. By way of further example, the present systems and methods can be applied in context of an individual participating in a dieting regimen, wherein a diet plan administrator can establish limitations upon the various foods that the dieter can purchase. It can be readily appreciated that the present systems and methods can be similarly applied in any number of additional contexts and/or settings without departing from the spirit of the present disclosure.

Alternatively, it should also be appreciated that the present systems and methods can be similarly implemented and/or arranged with minor modifications within the roles of the various parties reference above, particularly with regard to the roles of the first party 115 and the second party 135, and their respective corresponding devices, device 125 and device 145. For instance, it can be understood that in certain arrangements, such as a diet management system, first party 115 (in conjunction with device 125) can assume many, if not all of the functions/roles described herein as corresponding to second party 135 (in conjunction with device 145). By way of example, the criteria stored in transactional limitations database 150 (such as nutritional requirements for food purchases in a diet management system) can be both defined by and imposed upon first party 115 (in contrast to the system disclosed above wherein the second party 135 defines the transactional limitations that are imposed upon first party 115).

Accordingly, it can be further appreciated that the systems and methods described herein can be further implemented to enable consumers to conduct routine transactions in a more expedient and secure way. In using the present systems and methods (even without implementing any of the transactional limitations disclosed herein), a customer can initiate and execute transactions using only a unique identifier (and an associated further identifier), thereby obviating the need for the customer to provide an entire set of identification information (e.g., name, email address, etc.), payment information (e.g., credit card number, etc.) and shipping information (e.g., address, etc.) for each individual transaction. Having provided the customer's unique identifier, the TIM 105 can provide all such information directly to the seller 130, as described above. In addition, such a framework further improves the security of the transaction, as all sensitive information is transmitted only from TIM 105 to the seller 130.

In addition, such a framework can similarly be implemented by companies or corporations with respect to corporate and/or employee purchasing. Rather than requiring each employee to provide substantial personal information when making a purchase on behalf of the company, utilizing the present systems and methods unique identifiers can be assigned by the company to various of its employees. Such unique identifiers can be used by the employees when making purchases on behalf of the company, without requiring that the individual employees provide personal information when making the purchase (thus maintaining a greater degree of privacy for the company's employees and further increasing the security of the company's transactions, as described above).

Moreover, in certain arrangements the systems and methods disclosed herein can be implemented to further ensure the privacy of the identity of a given purchaser (e.g., first party 115), specifically by enabling first party 115 to initiate and execute transactions with seller 130 without providing seller 130 with any identifying information pertaining to first party 115 throughout the duration of the transaction. To do so, first party 115 can initiate an RFA that is transmitted from seller 130 to TIM 105, substantially as described above. TIM 105 can then authorize the purchase and withdraw the necessary fees directly from first party 115 (e.g., from the credit card account of first party 115). TIM 105 can then transfer such payment to seller 130, together with a confirmation instructing seller 130 to ship and/or deliver the selected item(s) to a third-party address provided by TIM 105 that is not associated with first party 115. Subsequently, TIM 105 can coordinate the redirecting of the purchased item(s) to first party 115. In doing so, only TIM 105 need be aware of first party's 115 identifying information, thereby successfully enabling first party 115 to initiate and execute a transaction with seller 130 without seller 130 having access to any identifying information pertaining to first party 115 at any point in time.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A computer implemented method for regulating a proposed transaction over a distributed computer network between a first party and a seller that has a commerce site accessible to the first party of the network, comprising the steps of:
   providing a transaction intermediary machine (TIM) on the network, the TIM including a processor, a control circuit, a memory accessible to the processor, and a regulation application comprising one or more software modules encoded in the memory and executed in the processor;
   associating a transactional limitations database in secure communication with the TIM, the transactional limitations database storing in relation to each of a plurality of unique identifiers at least one age-appropriateness content rating criterion that has been established by a second party with respect to age-appropriateness ratings established by a rating agency, wherein the at least one age-appropriateness content rating criterion dictates one or more transactional limitations imposed by the second party on the first party with respect to the age-appropriateness of one or more products;
   responsive to a search query from the first party, providing one or more search results to the first party, the one or more search results conforming to the at least one age-appropriateness content rating criterion and reflecting one or more items prospectively designated by the second party for approval;
   generating a promotion directed to the first party, the promotion being generated based on (a) the proposed transaction and (b) the at least one age-appropriateness content rating criterion;
   receiving a request for approval (RFA) of the proposed transaction from the seller at the TIM, the RFA comprising information communicated over the network and including (a) a unique identifier provided by the first party to the commerce site of the seller, and (b) a set of details concerning the proposed transaction between the first party and the seller which includes an amount for the proposed transaction yet which is free of personal identification information of the first party;
   confirming that the unique identifier is among the plurality of unique identifiers within the transactional limitations database associated with the TIM, and thereafter:
      comparing the set of details in the RFA with at least one age-appropriateness content rating criterion stored in the transactional limitations database in relation to the unique identifier;
      approving completion of the proposed transaction and a payment to the seller from an account of the second party for the amount of the proposed transaction if the RFA meets the age-appropriateness content rating criterion the amount of the proposed transaction reflecting the promotion; and
      providing personal identification information from the TIM to the seller that is sufficient to permit physical or electronic delivery to the first party in fulfillment of the proposed transaction; and
   denying execution of the transaction if:
      (1) the unique identifier is unknown, or
      (2) if the RFA does not meet the age-appropriateness content rating criteria in relation to the unique identifier.

2. The method of claim 1, further comprising reporting the RFA to the second party.

3. The method of claim 2, wherein the reporting step comprises reporting the RFA to the second party based on one or more rules established by the second party.

4. The method of claim 1, wherein the set of details includes information regarding one or more items or services that the first party is attempting to purchase from the seller.

5. The method of claim 1, wherein the approving step comprises transmitting an approval of the transaction to the seller.

6. The method of claim 1, wherein the denying step comprises transmitting a denial of the transaction to the seller.

7. The method of claim 1, further comprising: prior to the receiving step, receiving the one or more age-appropriateness content rating criterion from the second party.

8. The method of claim 1, wherein the TIM has access to an independent rating database.

9. The method of claim 1, wherein the personal identification information includes a mailing address.

10. The method of claim 1, wherein the personal identification information includes an electronic address.

11. The method of claim 1, further comprising:
   receiving the search query from the first party.

12. The method of claim 1, further comprising:
   generating a coupon directed to the first party based on at least one of the personal identification information and the age-appropriateness content rating criterion.

13. The method of claim 1, further comprising:
   prior to the approving step, transmitting a notification of the proposed transaction to the second party;
   receiving an approval or a denial from the second party in response to the notification.

14. A transaction regulation system for regulating a proposed transaction between a first party and a seller over a network, comprising:
   a processor;
   a control circuit operatively connected to the processor;
   a memory operatively connected to the control circuit and accessible by the processor;
   a regulation application stored in the memory and executable in the processor; and
   a transactional limitations database in communication with the control circuit, the transactional limitations database storing in relation to each of a plurality of unique identifiers at least one age-appropriateness content rating criterion that has been established by a second party with respect to age-appropriateness ratings established by a rating agency, wherein the at least one age-appropriateness content rating criterion dictates one or more transactional limitations imposed by the second party on the first party with respect to the age-appropriateness of one or more products; and
   wherein the regulation application, when executed by the processor, configures the control circuit to:

responsive to a search query from the first party, provide one or more search results to the first party, the one or more search results conforming to the at least one age-appropriateness content rating criterion and reflecting one or more items prospectively designated the second approval;

generate a promotion directed to the first party, the promotion being generated based on (a) the proposed transaction and (b) the at least one age-appropriateness content rating criterion;

receive a request for approval (RFA) of the proposed transaction from the seller, the RFA comprising information communicated over the network and including (a) a unique identifier provided by the first party to the seller, and (b) a set of details concerning the proposed transaction between the first party and the seller which includes an amount for the proposed transaction yet which is free of personal identification information of the first party;

confirm that the unique identifier is among the plurality of unique identifiers within the transactional limitations database, and thereafter:

compare the set of details in the RFA with at least one age-appropriateness content rating criterion stored in the transactional limitations database in relation to the unique identifier;

approve completion of the proposed transaction and a payment to the seller from an account of the second party for the amount of the proposed transaction if the RFA meets the age-appropriateness content rating criterion; and   provide personal identification information to the seller that is sufficient to permit physical or electronic delivery to the first party in fulfillment of the proposed transaction; and deny execution of the transaction if:

(1) the unique identifier is unknown, or

(2) if the RFA does not meet the age-appropriateness content rating criteria in relation to the unique identifier.

15. The system of claim 14, further comprising a rating database in communication with the control circuit, the rating database having access to one or more product ratings.

16. The system of claim 14, wherein the regulation application, when executed by the processor, further configures the control circuit to:

receive a search query from the first party; and provide one or more search results to the first party that meet the age-appropriateness content rating criteria.

17. The system of claim 14, wherein the regulation application, when executed by the processor, further configures the control circuit to generate a coupon directed to the first party based on at least one of the personal identification information and the age-appropriateness content rating criteria.

* * * * *